United States Patent
Stolz et al.

(10) Patent No.: US 9,083,078 B2
(45) Date of Patent: Jul. 14, 2015

(54) UNIVERSAL ANTENNA MOUNTING BRACKET

(71) Applicants: Adam Stolz, Springville, IN (US); Dean Jones, Bloomington, IN (US); Ralph Ausbrooks, Loogootee, IN (US); John Morgan, Bedford, IN (US); Kevin Broe, Bloomington, IN (US); Matthew Juhl, Springville, IN (US); Garric Henry, Bloomington, IN (US); Robert Huggins, Stafford, VA (US); Michael Schumm, Stafford, VA (US)

(72) Inventors: Adam Stolz, Springville, IN (US); Dean Jones, Bloomington, IN (US); Ralph Ausbrooks, Loogootee, IN (US); John Morgan, Bedford, IN (US); Kevin Broe, Bloomington, IN (US); Matthew Juhl, Springville, IN (US); Garric Henry, Bloomington, IN (US); Robert Huggins, Stafford, VA (US); Michael Schumm, Stafford, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 101 days.

(21) Appl. No.: 13/730,225

(22) Filed: Dec. 28, 2012

(65) Prior Publication Data

US 2013/0176182 A1 Jul. 11, 2013

Related U.S. Application Data

(60) Provisional application No. 61/581,720, filed on Dec. 30, 2011.

(51) Int. Cl.
*H01Q 1/32* (2006.01)
*B23P 19/00* (2006.01)

(52) U.S. Cl.
CPC ............. *H01Q 1/3283* (2013.01); *B23P 19/00* (2013.01); *Y10T 29/49826* (2015.01)

(58) Field of Classification Search
CPC .............................. B23P 19/00; H01Q 1/3283
USPC ................. 343/715, 711, 713, 888, 892, 900; 248/534; 29/428
See application file for complete search history.

(56) References Cited

U.S. PATENT DOCUMENTS

| 4,114,160 | A  | * | 9/1978 | Verini ........................... 343/715 |
| 4,158,844 | A  | * | 6/1979 | Wood ............................ 343/715 |
| 7,030,822 | B1 | * | 4/2006 | Grabowski ..................... 343/715 |
| 2008/0017426 | A1 | * | 1/2008 | Walters et al. ............... 180/65.2 |
| 2011/0187624 | A1 | * | 8/2011 | Lettkeman et al. ........... 343/882 |

* cited by examiner

*Primary Examiner* — Graham Smith
(74) *Attorney, Agent, or Firm* — Christopher A. Monsey (57) ABSTRACT

An apparatus for fastening an antenna to several vehicles which have restrictive placement locations is disclosed. One embodiment of the apparatus includes a mounting bracket and a shelf bracket; where the mounting bracket is adapted to be securely attached to several vehicles. An antenna mounts on the shelf bracket and the shelf bracket is adapted to be oriented to a preferred antenna position and to be securely attached to the mounting bracket.

1 Claim, 8 Drawing Sheets

UNIVERSAL ANTENNA MOUNTING BRACKET

CROSS-REFERENCED TO RELATED APPLICATION

The present application claims priority to U.S. Provisional Patent Application Ser. No. 61/581,720, filed Dec. 30, 2011, entitled "UNIVERSAL ANTENNA MOUNTING BRACKET," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used, or licensed by or for the United States Government for any governmental purpose without payment of any royalties thereon.

BACKGROUND OF THE INVENTION

Mobile radios are used in a variety of applications; for example, radio broadcasts, commercial communications, and specialized applications. All mobile radios require an effective antenna to appropriately send and/or receive radio signals. Each radio antenna has a unique set of characteristics, e.g., its wavelength, gain/loss, noise, and physical dimensions (e.g., length, circumference, weight, composition); each of the characteristics can impact the antenna's effectiveness during communications. Also important for effective communication is to effectively and securely mounting, e.g., fastening, the antenna to a vehicle having the radio, and then coupling them. The type of mount used is generally dependent on at least several features: the physical characteristics of the antenna, the environment that the vehicle will be exposed to while using the radio and therefore the antenna, and cost.

A mounting system can be unique or generic to the vehicle depending on the intended application and equipment. For general purpose radios, e.g., FM, AM, CB, etc.; and relatively light weight antennas for those systems, the selection and placement of an antenna mounting system is generally not restrictive. For example, the antenna is likely less than one (1) pound and generally less than three (3) feet in height. Thus, the load of the antenna on the mounting system of the antenna is relatively small. The mounting system can be fastened almost anywhere: on the side, roof, or bumper of the vehicle. Further, the mounting system can be any of a variety of fastening approaches, including: magnetic, screwed/bolted, and welded.

More specialized radios may require bigger, heavier duty antennas, "commercial antennas", which in turn, require heavier duty mounting systems. The increase in the physical characteristics of the antennae, e.g., increase in size, weight, height, or sensitivity, correspondingly increases the demands on the mounting system, not simply in terms of weight and gravitational forces placed on the mounting system by the heavier antenna, but also, at least, increased torque placed on the mounting system by the heavier antenna. For example, the antenna is likely to be two-five (2-5) pound (or more) and generally at least three (3) feet in length (if not longer). Thus, the load of the antenna on the mounting system of the antenna is significant. It would be desirable that a mounting system be strong and durable enough to hold a heavy antenna and strong and durable enough to resist torque on mounting systems. If the commercial antenna is to be applied to military vehicle, it is important to consider that the vehicle may travel at higher rates of speed (upwards of 50-60 miles per hour) and may be subject to sudden or hard turns, as well as being subject to traveling off-road. Thus, the mounting system must be strong enough to resist the torque caused by the heavy, long antenna while the vehicle is turning abruptly and quickly and other three axis stresses applied on the mounting system. The mounting system should also be strong and durable enough to resist environmental factors. Ideally, the mounting system would be designed such that it adapted to receive a standardized antenna base support.

Figure 1:
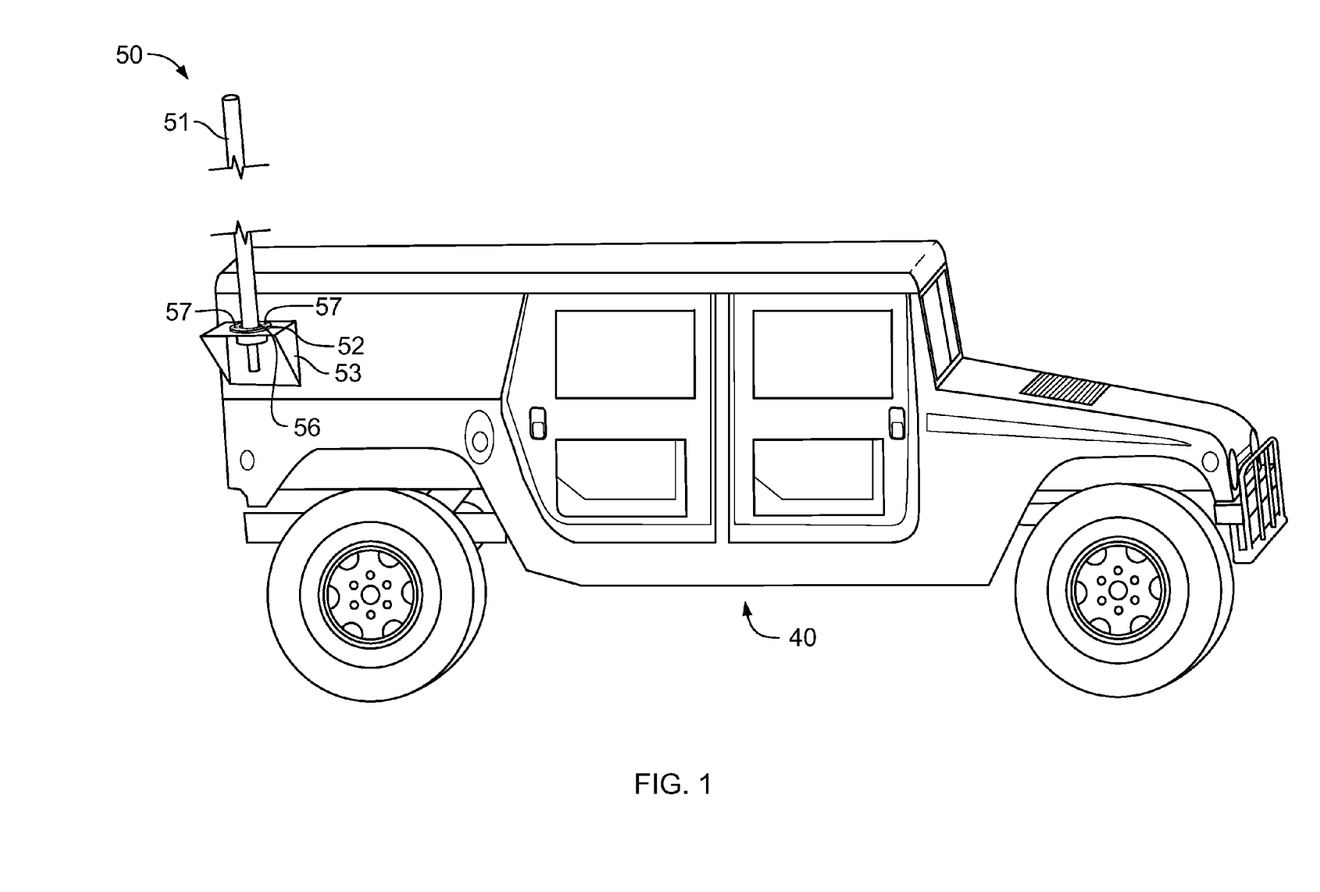
FIG. 1 shows an antenna system mounted on a conventional mounting bracket.

FIG. 1 depicts an exemplary antenna system 50 deployed on a vehicle 40. The antenna system 50 includes an antenna 51 and an antenna base 52. The antenna system 50 is mounted to a vehicle mounting system 53, e.g., a mounting bracket, which, in turn, is mounted on a vehicle 40. In this example, the antenna 51 is a commercial, heavy duty antenna, cylindrical in diameter, approximately two (2) feet in length and weighing between 10-20 lbs. The antenna base 52 couples the antenna 51 to the mounting system 53. The antenna base 52 has a standard disk like configuration having a central aperture 56, generally three inches (3") in diameter, to receive the antenna 50. The antenna base 52 also includes a fastening system (for simplicity, not shown) to secure the antenna 51 to the antenna base 52, and four (4) apertures, e.g., bolt holes (for simplicity, not shown), being offset by four inches (4"), that correspond to the apertures in the mounting system 53, to respectively couple bolts through the antenna base 52 to the mounting system 53, thereby fastening the antenna base 52 to the mounting system 53. The mounting system 53 is bolted (not shown) to the vehicle 40. After the antenna 51 is securely fastened to the vehicle 40, the antenna 51 can be electrically coupled, through an appropriate cable, to radio for use.

There may be certain considerations that should be accounted for when choosing the location and orientation of the mounting system 53. For example, for many radio systems, the mounting system 53 is ideally oriented so that the when the antenna system 50 is mounted in the mounting system 53 on a vehicle 40, the antenna 51 is at a zero (0) degree orientation, e.g., perpendicular in a Z direction, to the ground underneath the vehicle 40 in both the Y and X directions.

Further, the antenna system 50 and the mounting system 53 should be placed so that they do not interfere with operational characteristics of vehicle. For example, placement should take into consideration: visibility by at least the driver of the vehicle, the operation of headlights, any moving parts on the vehicle (e.g., hood, trunk, doors, lockers), vehicle clearance (above and below the vehicle), the operation of armament and artillery, and ingress/egress of the vehicle. Further, if the vehicle has special features, it is important that the antenna system 50 and the mounting system 53 do not lessen or denigrate those attributes. For example, armored vehicles have special armor plating; arbitrarily fastening a mounting system 53 to/through an armor plate may affect the functionality of the armor plating. Thus, it would ideal for a mounting system that uses existing fasteners, e.g., bolts, extending from the vehicle to fasten the mounting system 53. Additionally, with certain radio systems there are preferred placement location(s) and orientation(s) on the vehicle to maximize the efficiency and/or operation of the radio system.

It would also be desirable to have a single mounting system that can be used on plurality of vehicles.

DETAILED DESCRIPTION OF THE INVENTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical, or other changes may be made to the specific embodiments disclosed without departing from the spirit and scope of the present invention.

The invention discloses a mounting system that enables securely mounting of an antenna system to a variety of vehicles. The mounting system is designed to address resist twisting and warping.

A mounting system for an antenna was designed for employing a radio controlled improvised explosive device ("RCIED") jamming system into an armored military vehicle. This mounting system used existing fasteners in the vehicle to fasten the mounting system and preferred placement and orientation of the antenna. However, under this approach to creating mounting systems for different armored military vehicles, which have at least slightly different existing fasteners in the vehicle to fasten the mounting system and preferred placement and orientation of the antenna, required creating a different mounting bracket for each different type of vehicle that would uses a RCIED. This approach not only required additional engineering efforts but it made supply logistics much more difficult. For example, this approach requires that several different brackets would have to be designed, created, kept on file, in storage, and available for immediate replacement out on location, e.g., out in the field or other distant locations. Under this approach, production costs are larger as well as multiple designs had to be set up, fabricated, and labeled.

Figure 2A:
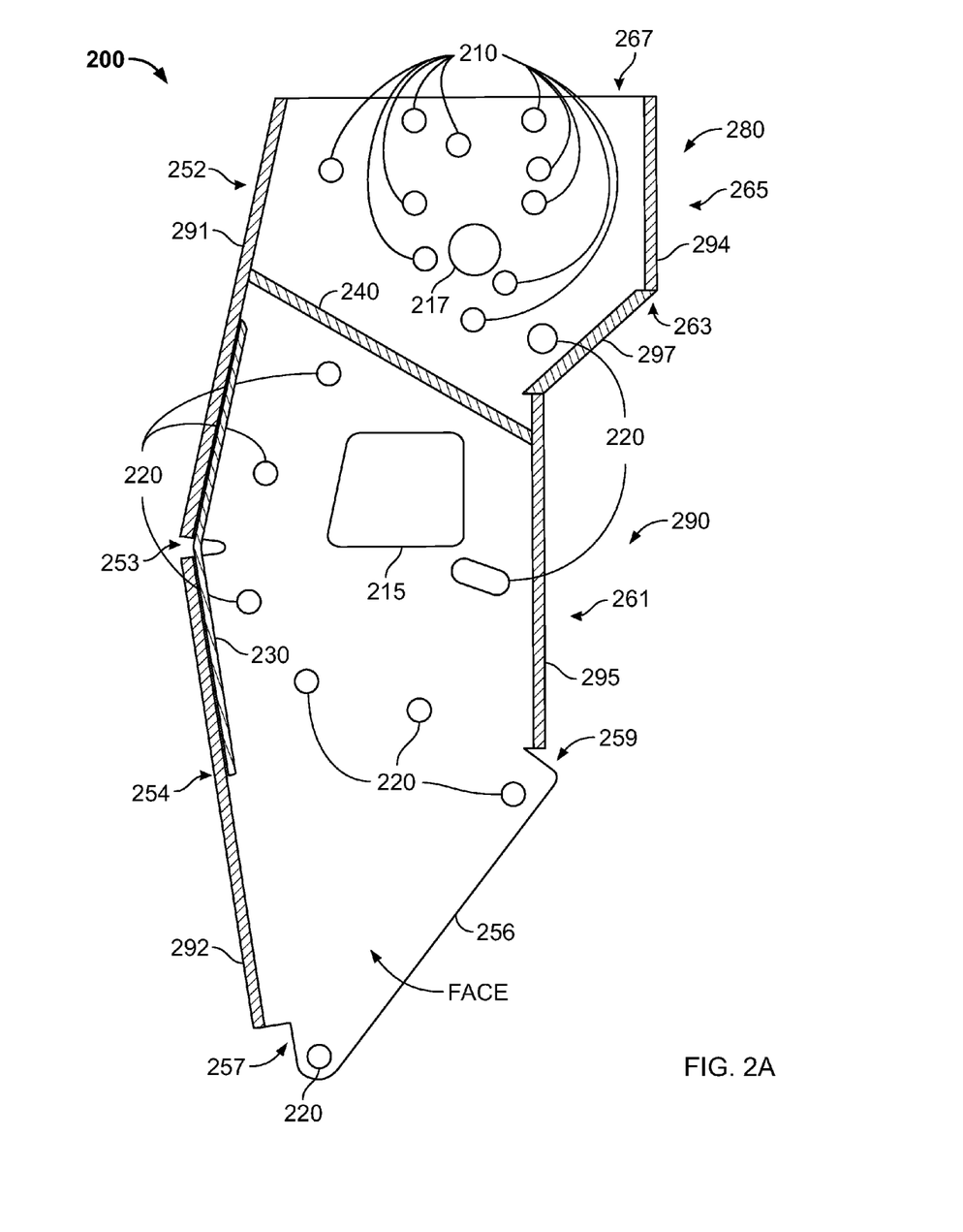
FIG. 2 depicts a plan view of a universal mounting bracket in accordance with an exemplary embodiment of the invention.
Figure 2B:
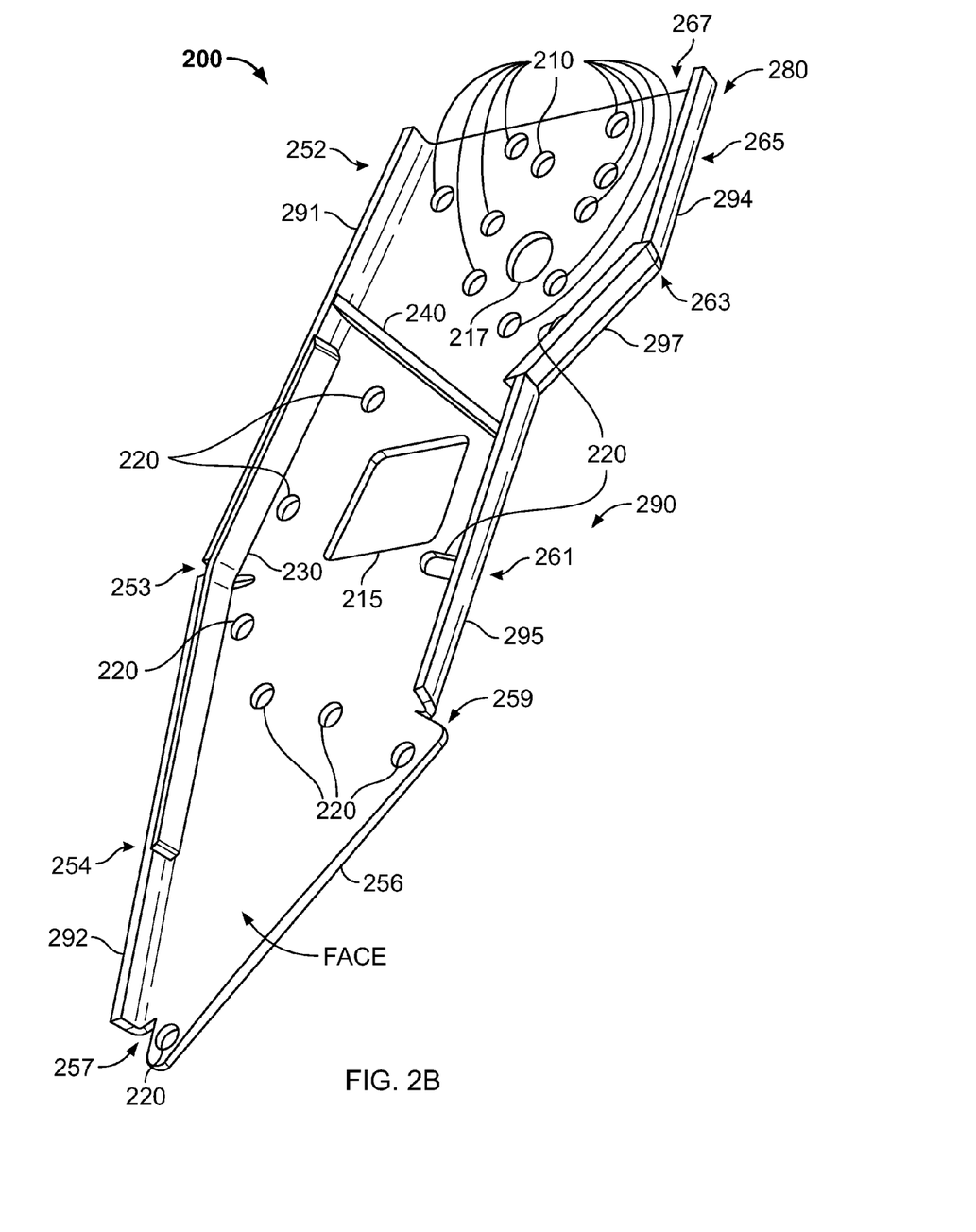

FIG. 2 depicts a universal mounting bracket 200 in accordance with an exemplary embodiment of the invention. The bracket 200 is a substantially planar unit with stiffening structures and mounting structures.

When viewing bracket 200 in a top down perspective, the face of bracket 200 is substantially planer and the bracket 200 is generally trapezoidal in shape. The bracket 200 also includes structures to increase its stiffness and resistance to warping and deforming under stress. If side 267 is considered to be the "top" of bracket 200, then the sides of bracket 200 have a portion of the edge that is folded up away from the face to form flanges. The flanges on the left side, flanges 291, 292, are reinforced with a reinforcement bracket 230. Flanges on the right side, flanges 294, 295, are reinforced with a reinforcement bracket 297. Mounting bracket 200 also includes a cross brace 240.

More specifically, bracket 200 has a top edge 267 which is approximately eight and one half inches (8½") in length. The upper part of the left side of bracket 200, left edge 252, extends down about ten inches (10") at approximately a 78° angle. The lower part of the left side of bracket 200, left edge 254, extends down about ten inches (10") at approximately a 20° angle. From there, the bottom edge 256 extends approximately seven inches (7") back up at approximately a 75° angle. At that point, the right edge 261 extends approximately seven and three quarter inches (7¾") at approximately a 30° angle. Right edge 263 then extends approximately two and three quarter inches (2¾") at approximately a 45° angle. Right edge 265 then extends approximately four and one quarter inches (4¼") at approximately a 45° angle, whereby the right edge connects to the top edge 267.

In a preferred approach, the mounting bracket 200 is made from 0.250 inch steel sheet, but any suitable material can be used. A desirable material provides secure, reliable, and durable performance. Although steel was chosen due to its reasonable cost and easily available in addition to providing secure, reliable, and durable performance, the invention is not so limited.

To increase the rigidity of the mounting bracket 200, as noted above, several of the edges have flanges that are approximately one-half inch (½") in width, extending in a perpendicular direction away from a plane formed by the face of mounting bracket 200. Thus, edges 252, 254, 261, and 265 have flanges. In an aspect, edges 267 and 256 do not have flanges. Furthermore, a first reinforcement bracket 230 is fastened, preferable through welding, to part of flange of 292 and extends and is also fastened, preferable through welding, to part of flange 291. First reinforcement bracket 230 is approximately ten inches (10") in length and width of one-half inch (½"). First reinforcement bracket 230 is fashioned from the similar material used to fashion mounting bracket 200, and having a similar thickness. First reinforcement bracket 230 is positioned such one of its edges is substantially flush with the face of mounting bracket 200. First reinforcement bracket 230 has a slight bend; the angle of the bend corresponds to the angle formed between the plane formed by flange 292 and the plane being formed by flange 291. In a preferred approach, the angle is approximately 20°. Edge 263 also includes reinforcement bracket 297 which is coupled, preferably by welding to the face of bracket 200 to be substantially perpendicular to the face. The bracket 297 is approximately one-half inch (½") in width, and coupled, preferably by welding, at its top to the bottom end of flange 294 and at its bottom to the top of flange 295.

A second reinforcement bracket 240 is fastened, preferable through welding, to part of flange 295 and extends and is also fastened, preferable through welding, to part of flange 291, as depicted in FIG. 2. Second reinforcement bracket 240 is approximately seven inches (7") in length and width of one-half inch (½"). Second reinforcement bracket 240 is fashioned from the similar material used to fashion mounting bracket 200, and having a similar thickness. Second reinforcement bracket 240 is positioned such one of its edges is substantially flush with the face of mounting bracket 200. Part or all the edges of second reinforcement bracket 240 may be angled or rounded so that second reinforcement bracket 240 sits flush with the face of mounting bracket 200 and flush with flange 295 on one end and flange 291 on the other end.

Figure 3:
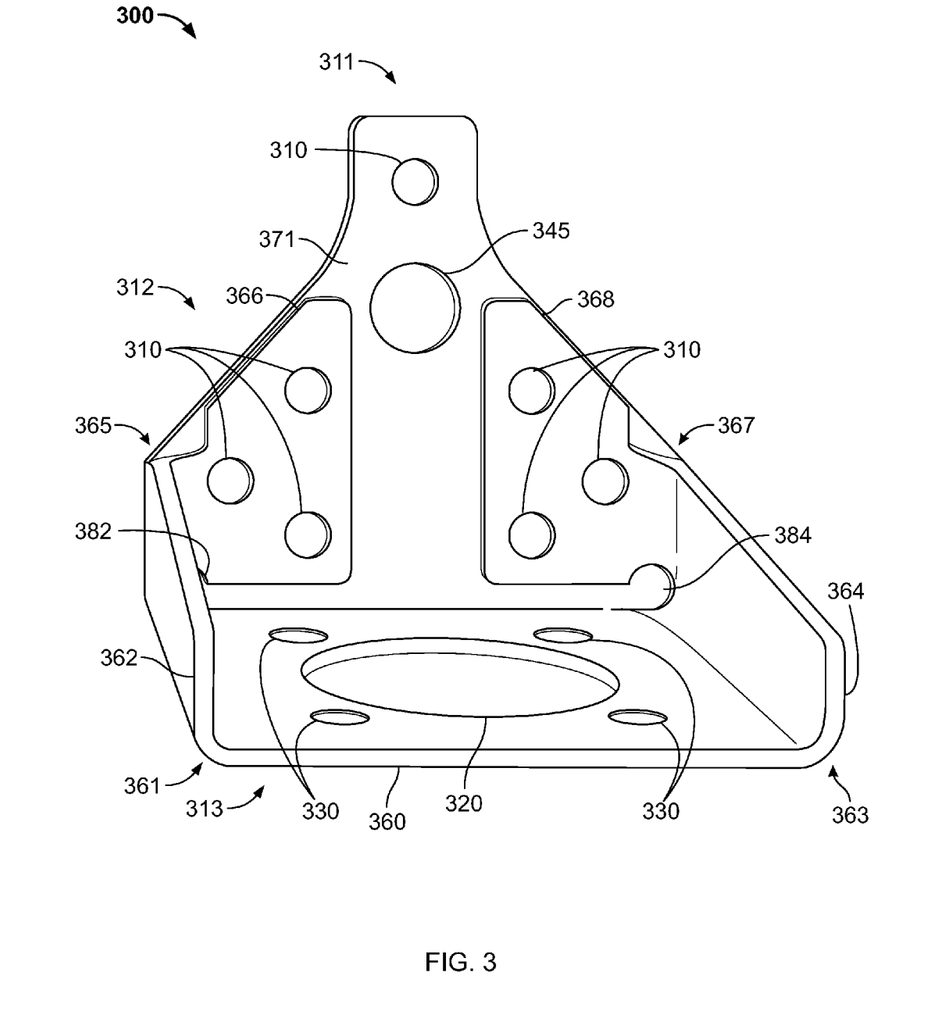
FIG. 3 depicts a front perspective of a shelf bracket in accordance with an exemplary embodiment of the invention.

As seen in FIG. 2, the mounting bracket 200 includes a plurality of apertures, slots, and openings. A first group of the apertures, slots and openings in the 280 region of mounting bracket 200 are generally directed towards coupling with a mounting bracket 200 with a shelf bracket 300 (as depicted in FIG. 3) thereby coupling the mounting bracket 200 to an antenna base. For example, apertures 210 and opening 217 of FIG. 2 are appropriately sized and used to receive fasteners, e.g., bolts, that are used to fasten mounting bracket 200 with an L-bracket (as depicted in FIG. 3). Opening 217 can also be used for a communication cable or other type of wiring. Not all of the apertures, slots, and openings are generally used in any one mode of operation, e.g., an installation on a vehicle. For example, three of the apertures, slots, and openings are used for mounting a shelf bracket on a first vehicle, and three of the apertures, slots, and openings are used for mounting a shelf bracket on a second vehicle, whereby the three apertures, slots, and openings used for the first vehicle may be utilize some, none, or all of the same apertures, slots, and openings used for the second vehicle. Thus, the various apertures, slots, and openings enable the use of the shelf bracket for different mounting methods and orientations on different vehicles at different times.

A second group of the apertures, slots, and openings in the 290 region of mounting bracket 200 of FIG. 2 are generally directed towards coupling a mounting bracket with a vehicle. For example, apertures and slots 220 and opening 215 of FIG. 2 are appropriately sized and used to receive fasteners, e.g., bolts, which are used to fasten mounting bracket 200 to a vehicle. Not all of the apertures, slots and openings are generally used in any one mode of operation. For example, three of the apertures, slots, and openings are used for mounting a mounting bracket on a first vehicle, and three of the apertures, slots, and openings are used for mounting a mounting bracket on a second vehicle, whereby the three apertures, slots, and openings used for the first vehicle may be utilize some, none, or all of the same apertures, slots, and openings used for the second vehicle. Thus, the various apertures, slots, and openings enable the use of the mounting bracket for different mounting methods and orientations on different vehicles at different times.

The design of the shape of mounting bracket 200 is partially dictated by a desire use the mounting bracket 200 on different vehicles. For example, the different vehicles are: a military vehicle M114, a military vehicle M1151, M1152, M1165, and a military vehicle medium tactical vehicle replacement ("MTVR"), all of which generally have restrictive locations where a mounting bracket can be placed. When mounting a mounting bracket on an armored vehicle, like the vehicles referenced above, it is preferred that existing bolts or bolt apertures are utilized to avoid adding a new aperture to the vehicle's armor, which can, among other things, adversely affect the armor's protection and effectiveness. Mounting bracket 200 is also designed to relatively small to minimize space used by the bracket.

When designing the mounting bracket 200, once a preferred location is determined, then configuration of the mounting bracket 200 is determined that enables the secure mounting of an antenna system. After the configuration is determined, then the shape of the mounting bracket 200 is determined such that it does not interfere or impede the operation of the vehicle. For example, the existing mounting features of the vehicle, e.g., existing apertures or bolts on said vehicle are used to determine orientation of said mounting bracket. For example, the shape of edges 257 and 259 are rounded, and formed without a flange to help facility access to apertures 220 close to edges 257 and 259. Feature 253 is a cutout to minimize cross stress on bracket 200; by including this cutout, the tendency of bracket 200 to rip across an area near 253 is reduced.

Figure 4:
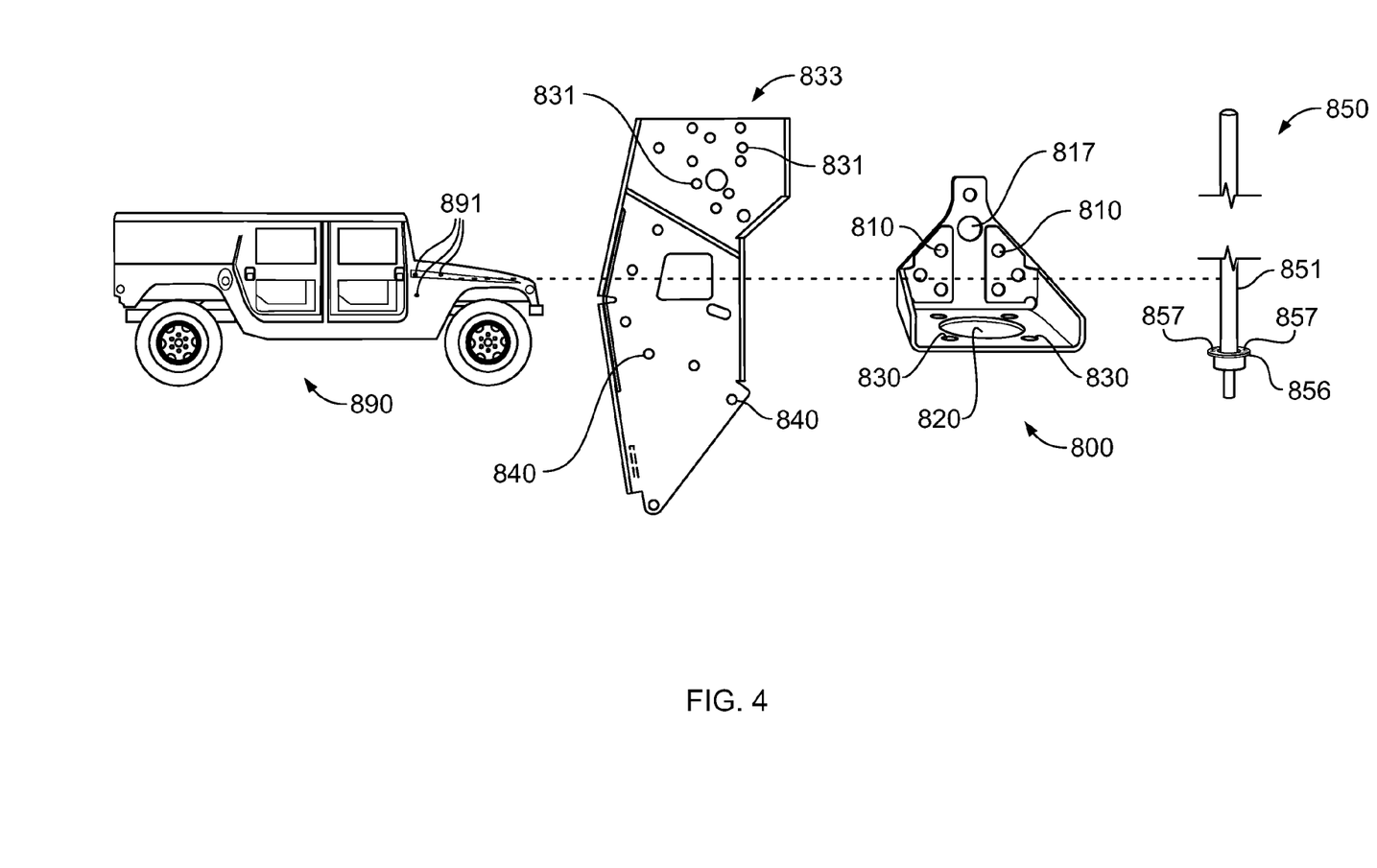
FIG. 4 depicts an exploded view of an antenna system being coupled to a vehicle through a shelf bracket and a mounting bracket.

A shelf bracket 300 is depicted in FIG. 3 in accordance with an exemplary embodiment of the invention. Shelf bracket 300 is adapted to receive an antenna and an antenna base. The shelf bracket 300 has a first portion 312 and a second portion 313, where the first portion 312 is generally designed to be fastened to and be substantially flush against the mounting bracket 200. The second portion 313 is generally designed to be fastened to the antenna base 856 (FIG. 4). The second portion 313 of shelf bracket 300 (FIG. 3) is substantially a horizontal shelf that is substantially perpendicular to the back plate 312. In other aspects, the shelf 313 is not limited to being perpendicular and is set at another angle or angles. For reference purposes only, the portion 311 is designated as the top of bracket 300.

In an approach, the bracket 300 is formed from a single piece of 0.250 inch steel sheet. Assuming that the sheet is already cut to the appropriate design, portion 362 is bent at substantially a right angle with respect to portion 360 along bend 361 and portion 264 is bent at substantially a right angle with respect to portion 360 along bend 363. Then portion 366 is bent at substantially a right angle with respect to portion 362 along bend 365 and portion 368 is bent at substantially a right angle with respect to portion 364 along bend 367. Portion 366 is coupled to the face of portion 371 preferably by welding and lined up such that apertures 310 line up with corresponding apertures in portion 371 resulting in respective apertures through the face of portion 366 and the back of portion 371. Similarly, portion 368 is coupled to the face of portion 371 preferably by welding and lined up such that apertures 310 line up with corresponding apertures in portion 371 resulting in respective apertures through the face of portion 368 and the back of portion 371. Cutouts 382 and 384 are included to reduce the stress that may occur on bracket 300 at the formation of the bends 361 and 365 as well as 363 and 367, respectively. Although described with forming in a particular order, the invention is not so limited and any reasonable order can be employed. Furthermore, although described with reference to forming a single piece of steel, the invention is not so limited and can formed from a plurality of pieces.

The shelf 313 of the shelf bracket 300 includes four (4) apertures 330, e.g., bolt holes, being offset by four inches (4") that correspond in diameter and location to the apertures 857 in the antenna base 856 (FIG. 4), to respectively couple bolts through the antenna base 856 (FIG. 4) to the shelf bracket 300, thereby enable fastening the antenna base 856 to the shelf bracket 300. The shelf bracket 300 is also adapted to receive a lower part of an antenna 851. The shelf bracket 300 includes an aperture 320 that corresponds in location to a lower part of an antenna 850 (FIG. 4) and has a diameter at least slightly larger than the diameter of the lower part of the antenna 850. Aperture 345 is used in certain applications for a communication cable to pass through.

The shelf bracket 300 is also adapted to be fastened to mounting bracket 200 (FIG. 2). The shelf bracket 300 (FIG. 3) includes five (5) apertures 310, e.g., bolt holes, that correspond in diameter and location to the apertures 210 in the mounting bracket 200, to respectively couple bolts through the mounting bracket 200 to the shelf bracket 300, thereby fastening the shelf bracket 300 to the mounting bracket 200. The orientation of mounting bracket 200 mounted on a vehicle, and a desired orientation of the antenna, e.g., a first preferred orientation is 0° (roughly perpendicular to the ground), a second preferred orientation is 90°, and whether part 301 is on the top side or bottom side of shelf bracket 300, e.g., whether the shelf bracket is right side up or upside down, determines the orientation of shelf bracket 300. The desired orientation of shelf bracket 300 determines which apertures 210 of mounting bracket 200 (FIG. 2) correspond to the apertures 310 of shelf bracket 300 to maintain the desired orientation. Thus, it is those determined apertures 210 that are fastened with, for example, bolts, to the apertures 310 of shelf bracket 300.

As noted above, not all available holes and slots are used in anyone mode of operation. The various apertures, slots, and openings allow for different mounting methods and orientations on different vehicles. For example, the mounting bracket could be employed on other vehicles, e.g., emergency response vehicles (e.g., fire trucks and ambulances), National Guard vehicles, and TV/Radio broadcast vehicles. In addition, the antenna support base can be affixed to the mounting bracket in at least two orientations providing a larger number of possible applications for the invention.

FIG. 4 depicts an exploded view, not to scale, of an antenna system 850 coupled to a shelf bracket 800 coupled to a mounting bracket 833 coupled to a vehicle 890. Antenna system 850 comprises an antenna 851, an antenna base 856, and bolt holes in the antenna base 857. Shelf bracket 800, similar to the shelf bracket of FIG. 3, includes apertures 810, 817, 820, 830. Mounting bracket 833, similar to mounting bracket 200 of FIG. 2, includes apertures 831 and 840. Vehicle 890 includes apertures 891. To fasten the antenna system 851 to the vehicle 890: the aperture 820 of the shelf bracket 800 receives the lower part of antenna 851. Bolts (not shown) are received by apertures 857 of the antenna base 856 and apertures 830 of the shelf bracket 800 and are fastened to couple the antenna system 850 to the shelf bracket 800. Bolts (not shown) are received by apertures 810, and possibly aperture 817, of the shelf bracket and apertures 831 of the mounting bracket 833 and are fastened to couple the shelf bracket 800 to the mounting bracket 833. Bolts (not shown) are received by apertures 840 of the mounting bracket 833 and by apertures 891 of the vehicle 890 are fastened to couple the mounting bracket 833 to the vehicle 890. Thus, the antenna system 850 is coupled to the vehicle 890.

Figure 5:
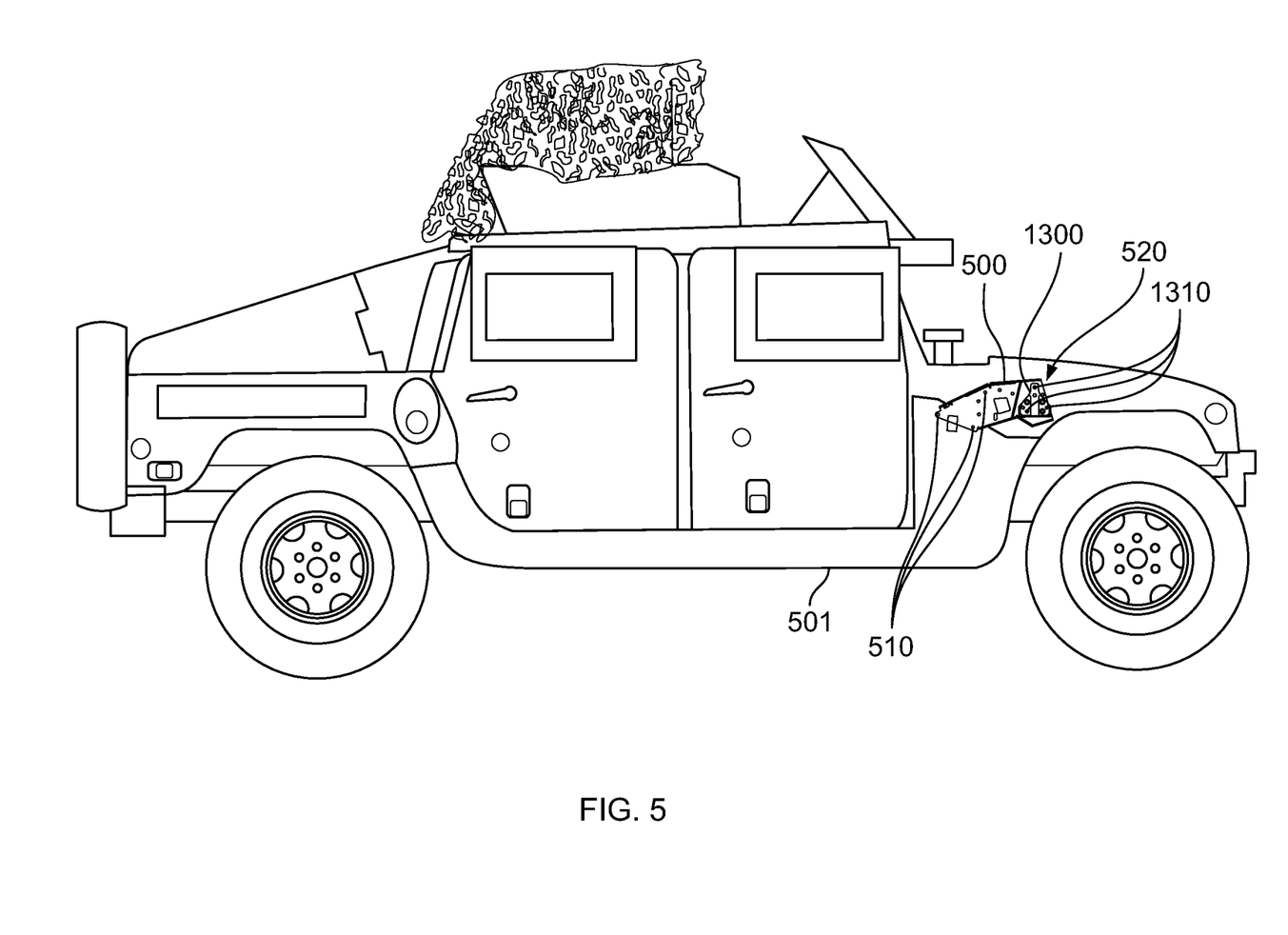
FIG. 5 depicts a mounting bracket fastened to a first vehicle in a first exemplary orientation of the invention.

FIG. 5 depicts a mounting bracket 500, similar to mounting bracket 200, fastened to a first vehicle in a first exemplary orientation of the invention—mounted on the passenger's side of the vehicle, between the passenger's door and the wheel well. The mounting bracket 500 is aligned with three (3) bolts (not shown for simplicity) currently in place on the exterior plate of the vehicle 501 and corresponding apertures 510 in the mounting bracket 500 utilized. When mounting the mounting bracket 500 on the vehicle 501, the bolts and their corresponding washers (not shown for simplicity) are removed from the vehicle 501, the mounting bracket 500 is placed such that apertures 510 are aligned with the apertures (not shown) in the vehicle 501 where the bolts were removed from, then bolts and their corresponding washers are fastened back into the vehicle 501 through apertures 510.

Apertures 1310 of the shelf bracket 1300, similar to shelf bracket of FIG. 3, are aligned with apertures 520 in mounting bracket such that the orientation of an antenna system mounted in shelf bracket 1300 would be substantially perpendicular to the ground. Bolts (not shown for simplicity) are placed in apertures 520 through the backside side of mounting bracket 500, the shelf bracket 300 is appropriate oriented, preferably horizontal to the ground, and the bolts placed through apertures 1310. A washer and nut (not shown) is threaded on to each bolt and then securely fastened, thereby securing shelf bracket 1300 to mounting bracket 500. Thus, mounting bracket 500 and the shelf bracket 1300 are ready to receive an antenna.

Figure 6:
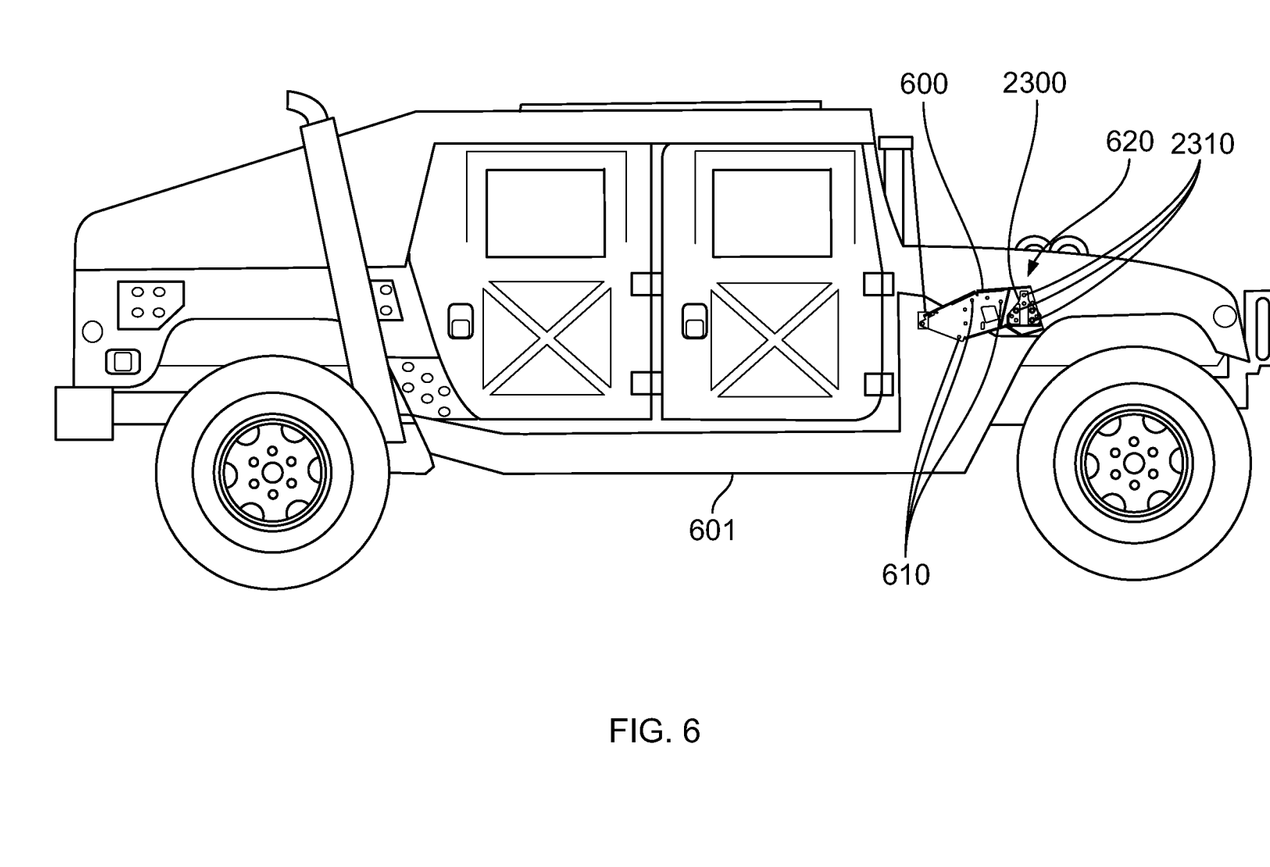
FIG. 6 depicts a mounting bracket fastened to a second vehicle in a second exemplary orientation of the invention.

FIG. 6 depicts a mounting bracket 600, similar to mounting bracket 200, fastened to a second vehicle in a second exemplary orientation of the invention—mounted on the passenger's side of the vehicle, between the passenger's door and the wheel well. The mounting bracket 600 is aligned with three (3) bolts (not shown for simplicity) currently in place on the exterior plate of the vehicle 601 and corresponding apertures 610 in the mounting bracket 600 utilized. When mounting the mounting bracket 600 on the vehicle 601, the bolts and their corresponding washers (not shown for simplicity) are removed from the vehicle 601, the mounting bracket 600 is placed such that apertures 610 are aligned with the apertures (not shown) in the vehicle 601 where the bolts were removed from, then bolts and their corresponding washers are fastened back into the vehicle 601 through apertures 610.

Apertures 2310 of the shelf bracket 2300, similar to shelf bracket of FIG. 3, are aligned with apertures 620 in mounting bracket such that the orientation of an antenna system mounted in shelf bracket 2300 would be substantially perpendicular to the ground. Bolts (not shown for simplicity) are placed in apertures 620 through the backside side of mounting bracket 600, the shelf bracket 2300 is appropriate oriented, preferably horizontal to the ground, and the bolts placed through apertures 2310. A washer and nut (not shown) is threaded on to each bolt and then securely fastened, thereby securing shelf bracket 2300 to mounting bracket 600. Thus, mounting bracket 600 and the shelf bracket 2300 are ready to receive an antenna.

Figure 7:
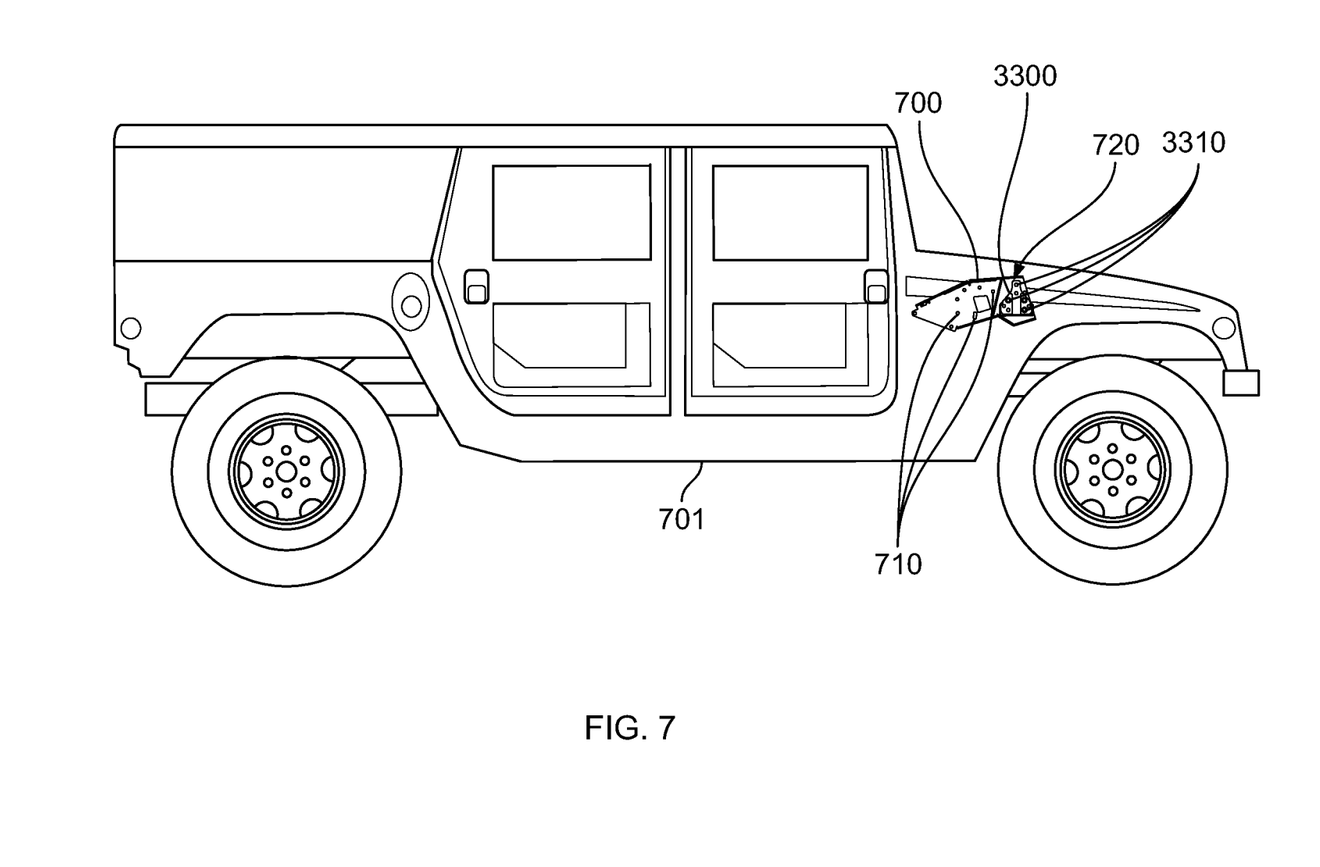
FIG. 7 depicts a mounting bracket fastened to a third vehicle in a third exemplary orientation of the invention.

FIG. 7 depicts a mounting bracket 700, similar to mounting bracket 200, fastened to a second vehicle in a second exemplary orientation of the invention—mounted on the passenger's side of the vehicle, between the passenger's door and the wheel well. The mounting bracket 700 is aligned with three (3) bolts (not shown for simplicity) currently in place on the exterior plate of the vehicle 701 and corresponding apertures 710 in the mounting bracket 700 utilized. When mounting the mounting bracket 700 on the vehicle 701, the bolts and their corresponding washers (not shown for simplicity) are removed from the vehicle 701, the mounting bracket 700 is placed such that apertures 710 are aligned with the apertures (not shown) in the vehicle 701 where the bolts were removed from, then bolts and their corresponding washers are fastened back into the vehicle 701 through apertures 710.

Apertures 3310 of the shelf bracket 3300, similar to shelf bracket of FIG. 3, are aligned with apertures 720 in mounting bracket such that the orientation of an antenna system mounted in shelf bracket 3300 would be substantially perpendicular to the ground. Bolts (not shown for simplicity) are placed in apertures 720 through the backside side of mounting bracket 700, the shelf bracket 3300 is appropriate oriented, preferably horizontal to the ground, and the bolts placed through apertures 3310. A washer and nut (not shown) is threaded on to each bolt and then securely fastened, thereby securing shelf bracket 3300 to mounting bracket 700. Thus, mounting bracket 700 and the shelf bracket 3300 are ready to receive an antenna.

The mounting bracket both accepts a universal antenna support base and is mountable to such a wide array of vehicle variants. This makes production, labeling, shipping, storage, and dissemination much simpler and less expensive than earlier methods of antenna attachment which required unique mounting brackets for each type of vehicle.

Furthermore, the mounting bracket includes several structural features to increase its rigidity—stiffening structures. As a result the mounting bracket of the increased stability the mounting bracket is decreased likelihood of twisting, warping, or otherwise deforming when exposed to lateral torque as well as other significant three dimensional stresses.

While the invention has been described and illustrated with reference to specific exemplary embodiments, it should be understood that many modifications and substitutions can be made without departing from the spirit and scope of the invention. For example, although the invention is generally described with reference to a radio, the invention is not limited and can be applied to any transmitter/receiver/transceiver system. Accordingly, the invention is not to be considered as limited by the foregoing description but is only limited by the scope of the claims.

What is claimed as new and desired to be protected by Letters Patent of the United States is:

1. An antenna mounting system, comprising:
a mounting bracket adapted to be securely coupled to a first and second vehicle, wherein said mounting bracket comprises a substantially planar section having a first edge on a first side of said planar section and a second edge on another side of said planar section, said first edge including a first bent section along a portion of said first edge formed to be substantially at a right angle to a face of said planar section, said second edge including a second bent section along a portion of said second edge formed to be substantially at a right angle to the face of said planar section, said second bent section along a portion of said second edge formed to be substantially at a right angle to said face of said planar section; and
a shelf bracket adapted to be securely coupled to said mounting bracket and adapted to be securely coupled to an antenna system
wherein said first edge further comprises a third bent section along a portion of said first edge formed to be substantially at a right angle to said face of said planar section; and
wherein said mounting bracket further comprises a first reinforcement structure, having a back edge and a first left edge, said back edge being coupled to said face of planar section, a portion of said first left edge being coupled to a portion of said first bent section, a second portion of said first left edge being coupled to a portion of said third bent section; and
wherein said first bent section is angled at a first angle with respect to said third bent section; and
wherein said second edge further comprises a fourth bent section along a portion of said second edge formed to be substantially at a right angle to said face of said planar section; and
wherein said mounting bracket further comprises a second reinforcement structure, having a back edge, top edge, and a bottom edge, said back edge being coupled to said face of planar section, said top edge being coupled to a bottom edge of said second bent section, said bottom edge being coupled to a top edge of said fourth bent section; and
wherein said mounting bracket further comprises a third reinforcement structure, having a back edge, a right edge, and a second left edge, said back edge being coupled to said face of planar section, said second left edge being coupled to said first bent section, said right edge being coupled to said fourth bent section; and
wherein said mounting bracket further comprises a first plurality of apertures for coupling said mounting bracket to said first vehicle; and
wherein said mounting bracket further comprises a second plurality of apertures for coupling said mounting bracket to said shelf bracket in a first and second orientation; and
wherein said mounting bracket further comprises a third plurality of apertures for coupling said mounting bracket to said second vehicle that are different than said first plurality of apertures;
wherein said first plurality of apertures are formed to align with a fourth plurality of apertures formed in a section of said first vehicle that couples a vehicle outer structure to said first vehicle by a first plurality of bolts or studs that also couples said mounting bracket to said first vehicle in a first mounting configuration;
wherein said third plurality of apertures are formed to align with a fifth plurality of apertures formed in a section of said second vehicle that couples a vehicle outer structure to said first vehicle by a second plurality of bolts or studs that also couples said mounting bracket to said second vehicle in a second mounting configuration.

\* \* \* \* \*